(12) United States Patent
Maeda

(10) Patent No.: US 8,329,806 B2
(45) Date of Patent: Dec. 11, 2012

(54) METHOD FOR PRODUCING FLAKY-GLASS GRANULE, FLAKY-GLASS GRANULE, AND RESIN COMPOSITION CONTAINING THE SAME

(75) Inventor: Takeshi Maeda, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 281 days.

(21) Appl. No.: 12/680,958

(22) PCT Filed: Oct. 3, 2008

(86) PCT No.: PCT/JP2008/068067
§ 371 (c)(1),
(2), (4) Date: Mar. 31, 2010

(87) PCT Pub. No.: WO2009/044866
PCT Pub. Date: Apr. 9, 2009

(65) Prior Publication Data
US 2010/0273928 A1    Oct. 28, 2010

(30) Foreign Application Priority Data
Oct. 5, 2007   (JP) .................................. 2007-262470

(51) Int. Cl.
*C09C 1/28* (2006.01)
*C08K 3/40* (2006.01)

(52) U.S. Cl. .......... 524/494; 264/117; 428/402; 501/20; 501/32; 501/33; 524/492; 524/493

(58) Field of Classification Search .................. 264/117; 428/402; 501/20, 32, 33; 524/492, 493, 524/494
See application file for complete search history.

(56) References Cited

U.S. PATENT DOCUMENTS

| | | | |
|---|---|---|---|
| 3,257,184 A | 6/1966 | Glaser | |
| 4,013,610 A * | 3/1977 | Tomohiro et al. | 523/217 |
| 5,002,827 A * | 3/1991 | Shimada et al. | 428/407 |
| 5,017,207 A | 5/1991 | Watkinson et al. | |
| 5,075,354 A | 12/1991 | Mitsuuchi et al. | |

FOREIGN PATENT DOCUMENTS

| | | |
|---|---|---|
| JP | 41-017148 B | 10/1961 |
| JP | 45-003541 B | 2/1970 |
| JP | 59-021533 A | 2/1984 |
| JP | 62-109855 A | 5/1987 |
| JP | 63-225554 A | 9/1988 |
| JP | 2-124732 A | 5/1990 |
| JP | 2-503669 A | 11/1990 |
| JP | 3-086753 A | 4/1991 |
| JP | 5-287175 A | 11/1993 |
| JP | 6-114256 A | 4/1994 |
| JP | 2002-212421 A | 7/2002 |
| JP | 2002-226732 A | 8/2002 |
| JP | 2003-082260 A | 3/2003 |
| JP | 2006-249291 A | 9/2006 |

* cited by examiner

*Primary Examiner* — Ling Choi
*Assistant Examiner* — Darcy D Laclair Lynx
(74) *Attorney, Agent, or Firm* — Hamre, Schumann, Mueller & Larson, P.C.

(57) ABSTRACT

The method for producing flaky-glass granules of the present invention is a method for producing flaky-glass granules by allowing a plurality of glass flakes to be bonded to each other so as to be granulated. The method includes the steps of: (I) adding at least one liquid selected from water and a volatile organic solvent to the plurality of glass flakes and stirring a resultant mixture, and (II) drying the plurality of glass flakes stirred with the liquid added thereto. Unlike conventional flaky-glass granules, the flaky-glass granules produced by this method contain neither a binder nor a surface treatment agent for bonding the glass flakes to each other. Thus, when mixed into a thermoplastic resin to be molded at a high temperature, the flaky-glass granules cause neither foam inclusion nor discoloration in a molded article of the resin.

7 Claims, No Drawings

METHOD FOR PRODUCING FLAKY-GLASS GRANULE, FLAKY-GLASS GRANULE, AND RESIN COMPOSITION CONTAINING THE SAME

TECHNICAL FIELD

The present invention relates to a method for producing flaky-glass granules, flaky-glass granules, and a resin composition containing the same.

BACKGROUND ART

Generally, glass flakes widely are used for applications such as a reinforcing material for thermosetting resin or thermoplastic resin, and a filler for corrosion-resistant lining.

JP 62 (1987)-109855 describes a technique for enhancing the strength and dimensional stability of a thermoplastic resin by mixing glass flakes into the thermoplastic resin. JP 63 (1988)-225554 A, JP 3 (1991)-86753 A, JP 5(1993)-287175 A, JP 2002-212421 A, and JP 2003-82260 A describe that flaky-glass granules formed using a binder and/or a surface treatment agent are mixed into a thermoplastic resin.

Since the glass flakes are scaly thin pieces, there has been a problem in that they have a high scattering property and they have poor workability before being mixed into the thermoplastic resin. Usually, an extruder is used when mixing glass flakes into a thermoplastic resin. However, since glass flakes are bulky and have a poor fluidity, there has been a problem of the glass flakes clogging a feeder and the mixability of the glass flakes into the thermoplastic resin is poor. In order to solve these problems, there has been developed a technique in which glass flakes are granulated using a binder and/or a surface treatment agent to form granules, and then the granules are mixed into a thermoplastic resin.

However, in the case where the flaky-glass granules formed using a binder and/or a surface treatment agent are mixed into a thermoplastic resin, a problem occurs occasionally in that when the thermoplastic resin is molded at a high temperature, the binder and/or the surface treatment agent is decomposed thermally and gas is generated, causing foam inclusion and discoloration in a molded article of the resin.

DISCLOSURE OF INVENTION

The present invention has been accomplished to solve the above-mentioned problems. An object of the present invention is to provide flaky-glass granules. The flaky-glass granules have low scattering property and excellent workability. Also, when mixed into a thermoplastic resin to be molded at a high temperature, the flaky-glass granules cause neither foam inclusion nor discoloration in a molded article of the resin. Another object of the present invention is to provide a resin composition from which a molded article having neither foam inclusion nor discoloration even when molded at a high temperature can be obtained.

The method for producing flaky-glass granules of the present invention is a method for producing flaky-glass granules by allowing a plurality of glass flakes to be bonded to each other so as to be granulated. The method includes the steps of (I) adding at least one liquid selected from water and a volatile organic solvent to the plurality of glass flakes and stirring a resultant mixture; and (II) drying the plurality of glass flakes stirred with the liquid added thereto.

The present invention also provides flaky-glass granules obtained by the above-mentioned production method.

The present invention further provides a resin composition containing the flaky-glass granules of the present invention and a thermoplastic resin.

For the flaky-glass granules obtained by the production method of the present invention, neither a binder nor a surface treatment agent having been used conventionally is used, and at least one liquid selected from water and a volatile organic solvent is used when bonding the plurality of glass flakes to each other. The liquid is removed by undergoing a drying process. Thus, the flaky-glass granules obtained by the present invention contain neither a binder nor a surface treatment agent. Thereby, even when the flaky-glass granules obtained by the present invention are added to a thermoplastic resin to be molded at a high temperature, no gas is generated during molding, and the foam inclusion and discoloration in the molded article of the resin can be suppressed. In addition, since the resin composition of the present invention contains the flaky-glass granules having these effects, no gases resulting from the binder and the surface treatment agent are generated during molding. Thus, it is possible to obtain a molded article having neither foam inclusion nor discoloration.

BEST MODE FOR CARRYING OUT THE INVENTION

The method for producing the flaky-glass granules of the present invention includes the steps of (I) adding at least one liquid selected from water and a volatile organic solvent to a plurality of glass flakes and stirring a resultant mixture; and (II) drying the plurality of glass flakes stirred with the liquid added thereto. More specifically, the production method of the present invention is a method in which the plurality of glass flakes are bonded to each other so as to be granulated, using at least one liquid selected from water and a volatile organic solvent. The flaky-glass granules obtained by the present invention are flaky-glass granules obtained by allowing the glass flakes to be bonded to each other without using a binder containing a binding component, such as a resin, and a surfactant, etc. Thus, even when mixed into a thermoplastic resin to be molded at a high temperature, the flaky-glass granules obtained by the present invention cause neither foam inclusion nor discoloration in a molded article of the resin. Hereinafter, embodiments of the present invention will be described in detail.

The glass flakes used for producing the flaky-glass granules of the present invention can be produced by, for example, a so-called blowing method as disclosed in JP 41 (1966)-17148 B and JP 45 (1970)-3541 B, and a so-called rotary method as disclosed in JP 59 (1984)-21533 A and JP2 (1990)-503669 T.

In the blowing method, a nozzle is put in a liquid tank containing molten glass, air is blown through the nozzle to inflate the molten glass into a so-called balloon, and the balloon is drawn by rollers. Thus, glass flakes are obtained. In the rotary method, molten glass is poured continuously into a rapidly rotating flat plate or bowl, and the molten glass is stretched over a rim of the plate or the bowl. Thus, glass flakes are obtained.

An average thickness and an average particle diameter of the glass flakes are not particularly limited. However, thin glass flakes have a large volume per unit weight because they have a low bulk density. Thus, forming the thin glass flakes into flaky-glass granules as in the present invention is effective in reducing the volume of the glass flakes significantly. In light of this, use of thin glass flakes in the present invention is effective in terms of workability and space for inventory. Specifically, when producing the flaky-glass granules of the present invention, it is extremely effective to use glass flakes with an average thickness of 2.0 µm or less and an aspect ratio (a value obtained by dividing the average particle diameter by the average thickness) of 50 or more, in terms of workability and space for inventory. Taking into consideration the technical difficulty and economical efficiency of the product, the average thickness preferably is 0.1 µm or more. Furthermore, the average particle diameter preferably is 10 µm to 2000 µm in order to make the glass flakes more effective in reinforcing the resin and reducing molding shrinkage of the resin. The average aspect ratio preferably is 2000 or less for dispersibility of the glass flakes into the resin. In this description, the average thickness of the glass flakes is a value obtained in the following manner. 100 or more samples of glass flakes are drawn from glass flakes. The thickness of each of these samples is measured using a scanning electron microscope (SEM), and the total of the thicknesses are divided by the number of the samples measured. The average particle diameter is defined as a particle diameter (D50) at which a cumulative mass distribution of particle size reaches 50% in a particle size distribution measured based on a laser diffraction/scattering method.

As mentioned above, in the present invention, the flaky-glass granules are produced by adding at least one liquid selected from water and a volatile organic solvent to the glass flakes, stirring the mixture, and drying the glass flakes. Specific methods for adding water, etc., stirring the mixture, and drying the glass flakes are not particularly limited. Examples thereof will be described hereinafter.

For example, a specified amount of water and/or a volatile organic solvent is added to the glass flakes with a spray, etc. while allowing the glass flakes to move in a mixer, such as a rotating disk mixer and a Henschel mixer with a revolving blade in a mixing vessel, so as to be stirred and mixed. Next, the glass flakes are dried while being stirred in the mixer, or the glass flakes are taken out from the mixer and dried. By this method, the flaky-glass granules of the present invention can be obtained.

As another example, it also is possible to produce the flaky-glass granules of the present invention by using a tumbling granulation method as described in JP 2 (1990)-124732 A. More specifically, the flaky-glass granules of the present invention can be produced by putting the glass flakes into a horizontal vibration granulation machine having a stirring blade, and spraying water and/or a volatile organic solvent thereto to granulate the glass flakes.

The flaky-glass granules of the present invention also can be produced by using known methods that are generally called a stirring granulation method, a fluidized bed granulation method, a spraying granulation method, and a tumbling granulation method, besides the above-mentioned methods.

The drying process is performed by, for example, drying the glass flakes at a temperature equal to or higher than the boiling point of the used liquid (water and/or a volatile organic solvent) until the liquid is volatilized.

The water used in the production method of the present invention is not particularly limited. From the viewpoint of preventing impurity from entering, ion exchange water or distilled water is preferable. Moreover, from the viewpoints of economical efficiency and safety, it is preferable to use water as the liquid to be added to the glass flakes.

The volatile organic solvent used in the production method of the present invention is not particularly limited. For example, methanol, ethanol, 2-propanol, ethyl acetate, n-butyl acetate, 2-propanone, 2-butanone, tetramethylene oxide, ethylene glycol monomethyl ether, ethylene glycol monoethyl ether, toluene, xylene, mineral spirit, n-hexane, and cyclohexane can be used. Among these, n-butyl acetate, ethylene glycol monomethyl ether, ethylene glycol monoethyl ether, xylene, and mineral spirit preferably are used from the viewpoints of safety and economical efficiency. In the present invention, only one volatile organic solvent may be used, or a plurality of volatile organic solvents may be used in combination. It also is possible to use a mixture of water and a volatile organic solvent.

In the production method of the present invention, the amount of the water and/or the volatile organic solvent added to the glass flakes is not particularly limited because it may be selected appropriately based on the size, glass composition, etc. of the glass flakes. For example, the amount of the water and/or the volatile organic solvent added to the glass flakes preferably is in the range of 0.3 times to 1.5 times a mass of the glass flakes.

The glass composition of the glass flakes used in the present invention is not particularly limited. Glass with a composition generally called E glass and C glass, as well as boron-free E glass disclosed in JP 2002-226732 A, etc. can be used.

When the flaky-glass granules thus obtained have excessively small particle diameters, the effect of preventing scattering is low. In contrast, when the flaky-glass granules have excessively large particle diameters, uniform dispersion of the flaky-glass granules when mixed into the thermoplastic resin is lowered. Taking into consideration the workability when mixed into the thermoplastic resin and the dispersibility in the thermoplastic resin, it is preferable that the flaky-glass granules have an average particle diameter of 20 µm to 3000 µm. With an average particle diameter of less than 20 µm, the flaky-glass granules may fail to have a sufficient effect of preventing their scattering, and become bulky and clog a feeder of an extruder easily in some cases. In contrast, with an average particle diameter of more than 3000 µm, the flaky-glass granules occasionally may have a lower dispersibility in the thermoplastic resin. When a mixer, such as the Henschel mixer, is used, it is possible to produce flaky-glass granules in desired sizes by adjusting appropriately the amount of the water and/or the volatile organic solvent added with a spray, etc., the stirring condition in the mixer, etc. during the granulation, drying condition, and the like. The flaky-glass granules each are a lump of glass flakes bonded to each other. Although the shapes of the flaky-glass granules vary according to the above-mentioned production conditions, they are approximately sphere or elliptical in general. In this description, the average particle diameter of the flaky-glass granules is a value obtained in the following manner. 100 or more samples are drawn from the flaky-glass granules. The particle diameter of each of these samples is measured using the scanning electron microscope, and the total of the diameters is divided by the number of the samples measured.

Next, the resin composition of the present invention will be described.

The resin composition of the present invention contains the flaky-glass granules and the thermoplastic resin. The thermoplastic resin used in the present invention is not particularly limited. A thermoplastic resin to be molded at a high temperature, such as a liquid crystal polymer (type I, type II, or type III), polyether ether ketone, polyphenylene sulfide, and highly heat-resistant nylon, can be used. When a resin composition obtained by mixing conventional flaky-glass granules containing a binder and/or a surface treatment agent into such a thermoplastic resin is used, foam inclusion and/or discoloration occurs in a molded article of the resin in some cases because the binder and the surface treatment agent generate gas when decomposed thermally at the molding temperature. In contrast, with the resin composition of the present invention, it is possible to provide a molded article that is free from foam inclusion and discoloration because the flaky-glass granules containing neither a binder nor a surface treatment agent are used for the resin composition.

EXAMPLES

The present invention will be described below in further detail using examples. The present invention is not limited to the following examples as long as they do not depart from the scope of the present invention.

Example 1

First, glass flakes were produced from E glass with the composition shown in Table 1 by the blowing method. Specifically, the E glass was put into a melting tank heated to 1200° C. or higher so as to be melted, a nozzle was put in the melting tank, the molten glass was inflated with air fed through the nozzle to be formed into a thin glass film, and the thin glass film was drawn continuously out of the tank by rollers. By adjusting the amount of the air to be fed and the rotational speed of the rollers, a glass film with an average thickness of 1.3 μm was obtained. Thereafter, the glass film was pulverized and classified, and thus glass flakes having an average particle diameter of 1000 μm were obtained. "Microtrack (registered trademark) HRA" manufactured by Nikkiso Co., Ltd. was used for measuring the average particle diameter of the glass flakes, and the same applies to the examples and comparative examples below.

TABLE 1

| | (Unit: mass %) |
| --- | --- |
| | E glass |
| $SiO_2$ | 54.7 |
| $Al_2O_3$ | 14.0 |
| CaO | 23.4 |
| MgO | 0.3 |
| $Na_2O$ | 0.4 |
| $K_2O$ | 0.2 |
| $Li_2O$ | — |
| $B_2O_3$ | 5.8 |
| Others | 1.2 |

Subsequently, 5 kg of the glass flakes was put into a Henschel mixer, and stirred and mixed for 15 minutes while 5 kg of ion exchange water was added thereto as a spray. Thereafter, the glass flakes were taken out and dried at 125° C. for 8 hours by a dryer. Thus, flaky-glass granules of Example 1 were obtained.

Example 2

First, glass flakes were produced from (boron-free) glass with the composition shown in Table 2 containing no boron by the blowing method. Specifically, the glass with the composition shown in Table 2 was put into a melting tank heated to 1200° C. or higher so as to be melted, a nozzle was put in the melting tank, the molten glass was inflated with air fed through the nozzle to be formed into a thin glass film, and the thin glass film was drawn continuously out of the tank by rollers. By adjusting the amount of the air to be fed and the rotational speed of the rollers, a glass film with an average thickness of 0.4 μm was obtained. After that, the glass film was pulverized and classified, and thus glass flakes having an average particle diameter of 200 μm were obtained.

TABLE 2

| | (Unit: mass %) |
| --- | --- |
| | Boron-free glass |
| $SiO_2$ | 61.1 |
| $Al_2O_3$ | 11.2 |
| CaO | 21.7 |
| MgO | 3.1 |
| $Na_2O$ | 1.3 |
| $K_2O$ | 0.6 |
| $Li_2O$ | 0.6 |
| $B_2O_3$ | — |
| Others | 0.4 |

Subsequently, 5 kg of the glass flakes was put into a Henschel mixer, and stirred and mixed for 15 minutes while 4 kg of ion exchange water was added thereto as a spray. Thereafter, the glass flakes were taken out and dried at 125° C. for 8 hours by a dryer. Thus, flaky-glass granules of Example 2 were obtained.

Example 3

Glass flakes were produced from the boron-free glass with the composition shown in Table 2 by the blowing method. Specifically, the glass with the composition shown in Table 2 was put into a melting tank heated to 1200° C. or higher so as to be melted, a nozzle was put in the melting tank, the molten glass was inflated with air fed through the nozzle to be formed into a thin glass film, and the thin glass film was drawn continuously out of the tank by rollers. By adjusting the amount of the air to be fed and the rotational speed of the rollers, a glass film with an average thickness of 0.7 μm was obtained. After that, the glass film was pulverized and classified, and thus glass flakes having an average particle diameter of 160 μm were obtained.

Subsequently, 5 kg of the glass flakes was put into a Henschel mixer, and stirred and mixed for 15 minutes while 3 kg of ion exchange water was added thereto as a spray. Thereafter, the glass flakes were taken out and dried at 125° C. for 8 hours by a dryer. Thus, flaky-glass granules of Example 3 were obtained.

Example 4

Flaky-glass granules were produced in the same manner as in Example 2, except that xylene, which is a volatile organic solvent, was used instead of the ion exchange water. The flaky-glass granules thus obtained were referred to as flaky-glass granules of Example 4.

Comparative Example 1

Glass flakes were produced from the E glass with the composition shown in Table 1 by the blowing method. Specifically, the E glass was put into a melting tank heated to 1200° C. or higher so as to be melted, a nozzle was put in the melting tank, the molten glass was inflated with air fed through the nozzle to be formed into a thin glass film, and the thin glass film was drawn continuously out of the tank by rollers. By adjusting the amount of the air to be fed and the rotational speed of the rollers, a glass film with an average thickness of 1.3 μm was obtained. After that, the glass film was pulverized and classified, and thus glass flakes having an average particle diameter of 1000 μm were obtained. The glass flakes thus obtained were referred to as glass flakes of Comparative Example 1.

Comparative Example 2

Glass flakes were produced from the boron-free glass with the composition shown in Table 2 by the blowing method. Specifically, the glass with the composition shown in Table 2 was put into a melting tank heated to 1200° C. or higher so as to be melted, a nozzle was put in the melting tank, the molten glass was inflated with air fed through the nozzle to be formed into a thin glass film, and the thin glass film was drawn continuously out of the tank by rollers. By adjusting the amount of the air to be fed and the rotational speed of the rollers, a glass film with an average thickness of 0.4 µm was obtained. After that, the glass film was pulverized and classified, and thus glass flakes having an average particle diameter of 200 µm were obtained. The glass flakes thus obtained were referred to as glass flakes of Comparative Example 2.

Comparative Example 3

Glass flakes were produced from the boron-free glass with the composition shown in Table 2 by the blowing method. Specifically, the glass with the composition shown in Table 2 was put into a melting tank heated to 1200° C. or higher so as to be melted, a nozzle was put in the melting tank, the molten glass was inflated with air fed through the nozzle to be formed into a thin glass film, and the thin glass film was drawn continuously out of the tank by rollers. By adjusting the amount of the air to be fed and the rotational speed of the rollers, a glass film with an average thickness of 0.7 µm was obtained. After that, the glass film was pulverized and classified, and thus glass flakes having an average particle diameter of 160 µm were obtained. The glass flakes thus obtained were referred to as glass flakes of Comparative Example 3.

Comparative Example 4

Flaky-glass granules were produced by the same manner as in Example 2, except that a mixed binding agent of an epoxy emulsion and a silane coupling agent was used instead of the ion exchange water. The flaky-glass granules thus obtained were referred to as flaky-glass granules of Comparative Example 4. Here, an emulsion (with a solid content of 50 wt %) obtained by emulsifying a bisphenol A epoxy resin with polyoxyethylene alkyl ether was used as the epoxy emulsion, and aminopropyl triethoxysilane was used as the silane coupling agent. The emulsion and the aminopropyl triethoxysilane were mixed at a solid content weight ratio of 4 to 1 to prepare the mixed binding agent.

The flaky-glass granules of Examples 1 to 4 and the glass flakes of Comparative Examples 1 to 4 produced as mentioned above were measured for powder properties using a PT-R powder tester manufactured by Hosokawa Micron Corp. Table 3 shows the results of Examples 1 to 4, and Table 4 shows the results of Comparative Examples 1 to 4.

Using the values of powder properties measured by the powder tester, a fluidity index and a floodability index of each of the samples were calculated based on the Carr index tables of Tables 5 and 6. These indexes also are shown in Table 3 and 4.

The fluidity index is given as a sum of indexes obtained by converting the measured values of angle of repose, compressibility ratio, spatula angle, and uniformity ratio, respectively, by using Table 5. A larger fluidity index indicates a better fluidity. The floodability index is given as a sum of indexes obtained by converting the measured values of angle of collapse, angle of difference, and dispersion ratio and the fluidity index, respectively, by using Table 6. A larger floodability index indicates a higher floodability, meaning that the glass flakes are scattered easily.

Using Table 3 and 4, the powder properties of the granulated glass flakes were compared with those of the non-granulated glass flakes. The comparison was made between the granulated glass flakes and the non-granulated glass flakes having the same glass composition, average thickness, and average particle diameter as each other. More specifically, the comparison was made between Example 1 and Comparative Example 1, between Example 2 and Comparative Example 2, and between Example 3 and Comparative Example 3, respectively. In each of these cases, the Example, in which the glass flakes had been granulated, showed a significantly higher loose density and tapped density than those of the Comparative Example. This reveals that use of the flaky-glass granules of the present invention makes it possible to reduce the capacity of the glass flakes more significantly, and is extremely effective in terms of workability and space for inventory. Moreover, comparisons made in the same manner as mentioned above prove that the Examples have a larger fluidity index and a smaller floodability index than those of the Comparative Examples, respectively. As a result, it is found that the granulated glass flakes have a satisfactory fluidity and hardly are scattered.

Furthermore, by comparing Example 4 with Comparative Example 2, it is found that the glass flakes have a reduced capacity, an enhanced fluidity, and a lower floodability even when they are granulated using the volatile organic solvent, as in the case (Example 2) where water was used.

The adhesion ratio of an organic substance to the flaky-glass granules of Comparative Example 4 calculated from a loss ratio measured when the flaky-glass granules were ignited at 625° C. was 0.60 wt %. Comparing the flaky-glass granules of Comparative Example 4 with the flaky-glass granules of Example 2, there are almost no differences therebetween in terms of the volume reduction, fluidity, and floodability. More specifically, it is proved that the flaky-glass granules formed using water as in the present invention can attain a volume reduction, fluidity, and floodability comparable to those of the flaky-glass granules formed using the binder.

Neither a binder nor a surface treatment agent is used for the flaky-glass granules of Examples 1 to 4. Thus, even when the flaky-glass granules are mixed into the thermoplastic resin to be molded at a high temperature, no gas is generated during molding, and neither foam inclusion nor discoloration occurs in the molded article of the resin.

TABLE 3

| | Example 1 | Example 2 | Example 3 | Example 4 |
|---|---|---|---|---|
| Glass composition of glass flakes | E glass | Boron-free glass | Boron-free glass | Boron-free glass |
| Average thickness of glass flakes (µm) | 1.3 | 0.4 | 0.7 | 0.4 |
| Average particle diameter of glass flakes (µm) | 1000 | 200 | 160 | 200 |
| Angle of repose (degree) | 45 | 44 | 50 | 50 |
| Loose density (g/cm³) | 0.168 | 0.276 | 0.164 | 0.132 |
| Tapped density (g/cm³) | 0.331 | 0.368 | 0.286 | 0.218 |
| Compressibility ratio (%) | 49 | 25 | 43 | 39 |
| Spatula angle (degree) | 44 | 50 | 50 | 44 |
| Uniformity ratio | 2.5 | 2.5 | 2.5 | 2.5 |
| Angle of collapse (degree) | 36 | 38 | 37 | 42 |
| Angle of difference (degree) | 10 | 6 | 13 | 8 |

TABLE 3-continued

|  | Example 1 | Example 2 | Example 3 | Example 4 |
|---|---|---|---|---|
| Dispersion ratio (%) | 78 | 67 | 77 | 36 |
| Fluidity index | 56 | 70 | 53 | 68 |
| Floodability index | 75 | 72 | 74 | 66 |

TABLE 4

|  | Comparative Example 1 | Comparative Example 2 | Comparative Example 3 | Comparative Example 4 |
|---|---|---|---|---|
| Glass composition of glass flakes | E glass | Boron-free glass | Boron-free glass | Boron-free glass |
| Average thickness of glass flakes (μm) | 1.3 | 0.4 | 0.7 | 0.4 |
| Average particle diameter of glass flakes (μm) | 1000 | 200 | 160 | 200 |
| Angle of repose (degree) | 55 | 54 | 55 | 42 |
| Loose density (g/cm$^3$) | 0.035 | 0.045 | 0.056 | 0.297 |
| Tapped density (g/cm$^3$) | 0.066 | 0.081 | 0.113 | 0.364 |
| Compressibility ratio (%) | 47 | 44 | 50 | 18 |
| Spatula angle (degree) | 41 | 44 | 40 | 52 |
| Uniformity ratio | 2.5 | 2.5 | 2.5 | 2.5 |
| Angle of collapse (degree) | 37 | 36 | 38 | 36 |
| Angle of difference (degree) | 18 | 18 | 17 | 6 |
| Dispersion ratio (%) | 52 | 77 | 53 | 61 |
| Fluidity index | 51 | 55 | 51 | 73 |
| Floodability index | 79 | 80.5 | 78 | 72 |

TABLE 5

<Table of powder fluidity index>

| Angle of repose | | Compressibility ratio | | Spatula angle | | Uniformity ratio | |
|---|---|---|---|---|---|---|---|
| Degree | Index | % | Index | Degree | Index | % | Index |
| ≦25 | 25 | ≦5 | 25 | ≦25 | 25 | 1 | 25 |
| 26-29 | 24 | 6-9 | 23 | 26-30 | 24 | 2-4 | 23 |
| 30 | 24.5 | 10 | 22.5 | 31 | 22.5 | 5 | 22.5 |
| 31 | 22 | 11 | 22 | 32 | 22 | 6 | 22 |
| 32-34 | 21 | 12-14 | 21 | 33-37 | 21 | 7 | 21 |
| 35 | 20 | 15 | 20 | 38 | 20 | 8 | 20 |
| 36 | 19.5 | 16 | 19.5 | 39 | 19.5 | 9 | 19.5 |
| 37-39 | 18 | 17-19 | 18 | 40-44 | 18 | 10-11 | 18 |
| 40 | 17.5 | 20 | 17.5 | 45 | 17.5 | 12 | 17.5 |
| 41 | 17 | 21 | 17 | 46 | 17 | 13 | 17 |
| 42-44 | 16 | 22-24 | 16 | 47-59 | 16 | 14-16 | 16 |
| 45 | 15 | 25 | 15 | 60 | 15 | 17 | 15 |
| 46 | 14.5 | 26 | 14.5 | 61 | 14.5 | 18 | 14.5 |
| 47-54 | 12 | 27-30 | 12 | 62-74 | 12 | 19-21 | 12 |
| 55 | 10 | 31 | 10 | 75 | 10 | 22 | 10 |
| 56 | 9.5 | 32 | 9.5 | 76 | 9.5 | 23 | 9.5 |
| 57-64 | 7 | 33-36 | 7 | 77-89 | 7 | 24-26 | 7 |
| 65 | 5 | 37 | 5 | 90 | 5 | 27 | 5 |
| 66 | 4.5 | 38 | 4.5 | 91 | 4.5 | 28 | 4.5 |
| 67-89 | 2 | 39-44 | 2 | 92-99 | 2 | 29-35 | 2 |
| 90 | 0 | >45 | 0 | >99 | 0 | >35 | 0 |

TABLE 6

<Table of powder floodability index>

| Fluidity index Index from Table 5 | Index | Angle of collapse Degree | Index | Angle of difference Degree | Index | Dispersion ratio % | Index |
|---|---|---|---|---|---|---|---|
| ≧60 | 25 | ≦10 | 25 | ≧30 | 25 | ≧50 | 25 |
| 59-56 | 24 | 11-19 | 24 | 29-28 | 24 | 49-44 | 24 |
| 55 | 22.5 | 20 | 22.5 | 27 | 22.5 | 43 | 22.5 |
| 54 | 22 | 21 | 22 | 26 | 22 | 42 | 22 |
| 53-50 | 21 | 22-24 | 21 | 25 | 21 | 41-36 | 21 |
| 49 | 20 | 25 | 20 | 24 | 20 | 35 | 20 |
| 48 | 19.9 | 26 | 19.9 | 23 | 19.9 | 34 | 19.9 |
| 47-45 | 18 | 27-29 | 18 | 22-20 | 18 | 33-29 | 18 |
| 44 | 17.5 | 30 | 17.5 | 19 | 17.5 | 28 | 17.5 |
| 43 | 17 | 31 | 17 | 18 | 17 | 27 | 17 |
| 42-40 | 16 | 32-39 | 16 | 17-16 | 16 | 26-21 | 16 |
| 39 | 15 | 40 | 15 | 15 | 15 | 20 | 15 |
| 38 | 14.5 | 41 | 14.5 | 14 | 14.5 | 19 | 14.5 |
| 37-34 | 12 | 42-49 | 12 | 13-11 | 12 | 18-11 | 12 |
| 33 | 10 | 50 | 10 | 10 | 10 | 10 | 10 |
| 32 | 9.5 | 51 | 9.5 | 9 | 9.5 | 9 | 9.5 |
| 31-29 | 8 | 52-56 | 8 | 8 | 8 | 8 | 8 |
| 28 | 6.25 | 57 | 6.25 | 7 | 6.25 | 7 | 6.25 |
| 27 | 6 | 58 | 6 | 6 | 6 | 6 | 6 |
| 26-23 | 3 | 59-64 | 3 | 5-1 | 3 | 5-1 | 3 |
| <23 | 0 | >64 | 0 | 0 | 0 | 0 | 0 |

INDUSTRIAL APPLICABILITY

The flaky-glass granules obtained by the present invention have a low dispersibility and excellent workability. In addition, when mixed into a thermoplastic resin to be molded at a high temperature, the flaky-glass granules cause neither foam inclusion nor discoloration in a molded article of the resin. Therefore, the flaky-glass granules obtained by the present invention and the resin composition of the present invention containing the flaky-glass granules are applicable to various resin-mold products.

The invention claimed is:

1. A method for producing flaky-glass granules from glass flakes by allowing a plurality of glass flakes to be bonded to each other so as to be granulated, the method consisting essentiality of:
   (I) adding only liquid selected from the group consisting of water, a volatile organic solvent, and a combination thereof to the plurality of the glass flakes and stirring a resultant mixture; and
   (II) drying the mixture including the plurality of the glass flakes stirred with the liquid added thereto.

2. The method for producing the flaky-glass granules from glass flakes according to claim 1, wherein in the step (I), only water is added to the plurality of the glass flakes, and the resultant mixture is stirred.

3. The method for producing the flaky-glass granules from glass flakes according to claim 1, wherein the volatile organic solvent is at least one solvent selected from the group consisting of methanol, ethanol, 2-propanol, ethyl acetate, n-butyl acetate, 2-propanone, 2-butanone, tetramethylene oxide, ethylene glycol monomethyl ether, ethylene glycol monoethyl ether, toluene, xylene, mineral spirit, n-hexane, and cyclohexane.

4. The method for producing the flaky-glass granules from glass flakes according to claim 1, wherein the glass flakes have an average thickness of 0.1 μm to 2.0 μm, an average particle diameter of 10 μm to 2000 μm, and an average aspect ratio of 50 or more, the average aspect ratio being obtained by dividing the average particle diameter by the average thickness.

5. Flaky-glass granules obtained by the production method according to claim 1.

6. The flaky-glass granules according to claim 5, wherein the granules have an average particle diameter of 20 μm to 3000 μm.

7. A resin composition containing the flaky-glass granules according to claim 5 and a thermoplastic resin.

\* \* \* \* \*